United States Patent [19]
Gotman

[11] Patent Number: 4,874,275
[45] Date of Patent: Oct. 17, 1989

[54] SECURE THREE-PIECE THREADED FASTENER, AND METHOD

[75] Inventor: Alexander S. Gotman, Los Angeles, Calif.

[73] Assignees: Gene W. Arant; Marvin H. Kleinberg; Marshall A. Lerner, all of Los Angeles, Calif.

[21] Appl. No.: 64,466

[22] Filed: Jun. 22, 1987

[51] Int. Cl.⁴ .................. F16B 31/00; F16B 39/02
[52] U.S. Cl. ......................... 411/5; 411/40; 411/271; 411/366; 29/525.1
[58] Field of Search .......................... 411/2-5, 411/39-41, 43, 44, 45, 55, 57, 60, 271, 389, 395, 366; 29/512, 517, 520, 526 R

[56] References Cited

U.S. PATENT DOCUMENTS

| | | | |
|---|---|---|---|
| 1,039,576 | 9/1912 | Mueller et al. | 411/2 |
| 2,974,558 | 3/1961 | Hodell | 411/43 |
| 3,482,864 | 12/1969 | Bynum | 411/5 |
| 4,326,825 | 4/1982 | Volkmann et al. | 411/5 |

FOREIGN PATENT DOCUMENTS

| | | | |
|---|---|---|---|
| 675305 | 10/1929 | France | 411/271 |
| 2305108 | 10/1976 | France | 411/271 |

*Primary Examiner*—Neill R. Wilson
*Attorney, Agent, or Firm*—Gene W. Arant

[57] ABSTRACT

A three-piece fastener includes a bolt with a shank having a concentric opening in its threaded end, a nut adapted to fit over the threaded end of the bolt, and a wedge member which is insertable into the end opening of the bolt for expanding and thereby securing it. The threaded end of the bolt is axially slotted to facilitate its expansion.

The outer diameter of the wedge member is smaller than the outer diameter of the threaded end of the bolt. When the bolt is to be inserted into an opening of a structure in order to accomplish a fastening action, the wedge member is first loosely inserted into the end opening of the bolt. Then when the bolt and wedge are passed through the opening, the nut is applied to the end of the bolt and is tightened. Thereafter, the wedge is tightened in order to expand the end of the bolt.

The end opening of the bolt has interior threads, and is threadedly engaged by the wedge member, but in an opposite rotational sense to that in which the nut is applied to the bolt. The wedge member has a driving portion on its outer end, and a weakened circumferential wall which fractures and shears off when a predetermined torque is applied for tightening the wedge member. After this shearing action takes place, the remaining part of the wedge member is wholly contained within the end of the bolt.

10 Claims, 1 Drawing Sheet

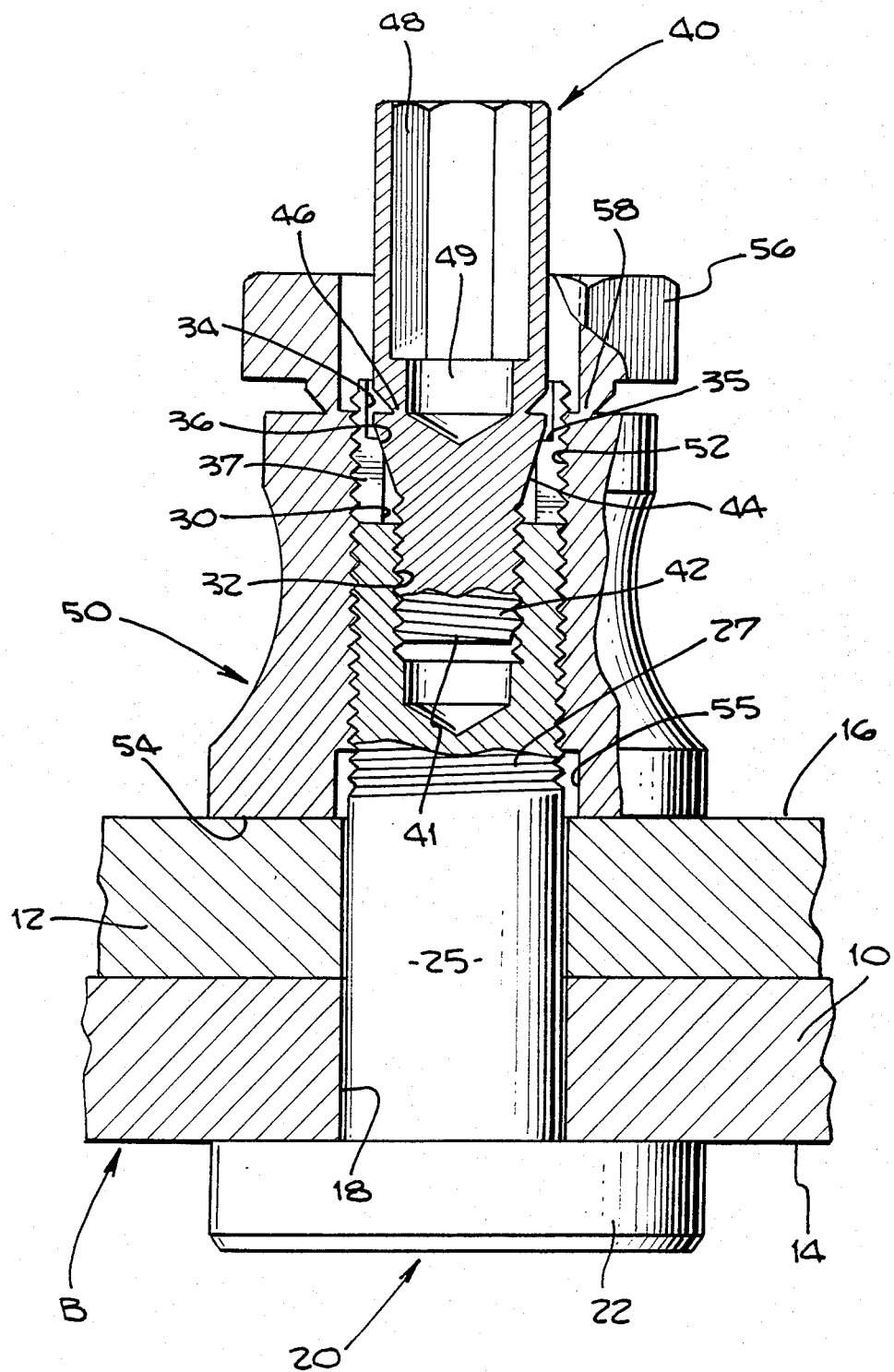

SECURE THREE-PIECE THREADED FASTENER, AND METHOD

BACKGROUND OF THE INVENTION

In the space and aircraft industries there is a crucial need for high-performance fastening systems. For example, a laminated frame structure consisting of layers of two or more different materials must have those layers securely fastened together at thousands of different points. A hole is formed at each location in accordance with desired criteria. Then a fastening system which passes through the hole is utilized to grip the layers of the frame structure together.

At each fastening location, there are a number of requirements which must or should be met, as follows:
(1) The parallel surfaces must be gripped throughout a predetermined area of each surface and with a predetermined amount of stress measured in a direction axial to the hole.
(2) In applying the fastener, the predetermined axial stress should not be exceeded, as otherwise there might be damage to the frame material on one or both layers.
(3) In applying the fastener, the fastener itself should not in any way be overstressed, as this might reduce its effectiveness.
(4) The fastener when in place should be entirely secure against vibration.
(5) The fastener when in place should be entirely secure against being removed.
(6) The fastener when in place should be entirely secure against tampering.
(7) The fastener should be constructed and/or operated in such manner that when in place, if it has been subject to tampering, it will itself provide visible evidence of such tampering.

PRIOR ART

Applicant is familiar with the Hi-Lok fastening systems manufactured and sold by Hi-Shear Corporation. The Hi-Lok device includes a bolt having an opening in its threaded end for receiving an allen wrench, which makes it possible for the operator to work from only one end of the fastener by using one wrench to hold the bolt against rotation while using another wrench to fasten the nut. Those products are said to be covered by U.S. Pat. Nos. 2,927,491; 2,940,495; 3,027,789; 3.138,987; and 3,578,367. Applicant is not familiar with the patents themselves and has not conducted a prior art search.

SUMMARY OF THE INVENTION

The present invention provides a three-piece threaded fastening system, and a method of applying or installing the fastener, which are calculated to meet all of the seven criteria listed above.

According to the present invention the, method of securely gripping together an assembly which has a hole therethrough is carried out as follows. A bolt or pin is selected which has a concentric opening in its threaded end and in which the wall around that end opening is axially slotted. An elongated wedge member is selected which has an outer diameter that is less than the outer diameter of the threaded end of the bolt. The wedge is partially inserted into the end opening of the bolt, preferably at the factory so that this operation does not have to be carried out in the field. Then the bolt, carrying the wedge with it, is inserted through the hole in the assembly so that the head of the bolt engages one side surface of the assembly and the threaded end of the bolt protrudes from the other side surface of the assembly. A nut which is mated to the bolt or pin is then slipped over the wedge member and onto the threaded end of the bolt, and is tightened against the other side surface of the assembly. Then the wedge is driven further into the end opening in the bolt so as to expand the slotted wall of the threaded end of the bolt tightly against the inner surface of the nut. As the final step, whatever portion of the wedge protrudes beyond the end of the bolt is sheared off and removed so as to ensure the permanency of the fastening.

According to the preferred form of the invention the wedge member is provided with wrench-gripping means on its rearward end and has its forward end threadedly secured within the end opening of the bolt. The end opening of the bolt is internally threaded. It is then essential that the internal and external threads of the bolt have opposite rotational sense; that is, if the external thread is a right-hand thread the internal thread is left-hand, or vice versa.

Another preferred feature of the invention is that the wedge member — sometimes also referred to as a set screw — has a weakened circumferential wall which provides a shear-off point. This shear-off point is located between a conically tapered wedge section that provides the wedging action and the wrench-gripping means on the rearward end of the member.

It is, therefore, the object and purpose of the invention to provide a secure three-piece threaded fastener and method of its use, which will satisfy all of the severe criteria for aircraft frame fasteners.

DRAWING SUMMARY

The sole drawing figure is a longitudinal cross-sectional view of the fastener of the present invention when installed in place in a frame assembly.

DETAILED DESCRIPTION

Referring now to the drawing, an assembly B which may for example be a section of an aircraft frame structure consists of two layers or sheets of material 10, 12. One surface of assembly B (the lower surface in the example) is designated by numeral 14 while the other or upper surface is designated as 16. A hole 18 has been formed through both of the material layers 10, 12, and therefore provides communication between the surfaces 14, 16.

The three-piece fastener of the present invention includes a bolt or pin 20, a wedge member or set screw 40, and a nut or collar 50. Each of these parts will now be described.

The bolt 20 has a head 22 and a shank 25. A rearward portion of shank 25 adjacent the head 22 has a smooth cylindrical surface. The forward end of shank 25 is also of cylindrical exterior configuration and has threads 27 formed thereon. Additionally, the forward end of the shank has a concentric end opening formed therein and a portion of its wall which surrounds that end opening axially slotted, for cooperation with the wedge member or set screw 40, as will be further explained in later paragraphs.

The nut or collar 50 is of conventional construction. It consists of a somewhat cylindrical body with a concave surface around its circumference at the middle of its length for easy finger gripping. An internal thread 52 is mated with the external thread 27 of the bolt 20. It has a bearing end face 54, the lower face as shown in the drawing. The end face 54 has a conventional counterbore 55. It will be seen that in the secured position of the fastener the end face 54 of the collar and the inner face of the bolt head 22 are quite comparable in their diameters and surface areas and hence are able to grip the frame surfaces 14, 16, in balanced fashion.

At its upper end the nut 50 also has a hexagonal wrench grip 56. Just forwardly of the wrench grip there is a weakened circumferential wall portion 58 which provides a shear-off point for the nut. As is well known in the art, the nut 50 may be applied to the bolt 20 with a controlled level of maximum torque through the action of the shear-off point. That is, the weakened wall is so designed as to fracture when the desired maximum torque is applied to the nut. The wrench grip may then be removed and will not be present in the final assembly.

The shear-off point in the nut 50 is not essential to the present invention, however. A wrench grip may instead be provided directly upon the body of the nut, immediately below the location of the shear-off point as shown in the present drawing. That design may be successfully used by employing a nut runner or other tool which itself controls and limits the maximum torque applied to the nut.

The wedge member 40 also contains a shear-off point, and as will be seen, that is quite essential to the purposes of the present invention.

More specifically, the wedge member 40 has a forward end 41 with external threads 42. Just rearwardly of the threads 42 it has a conically tapered wedge surface 44, which at its forward end is of about the same diameter as threads 42, but at its rearward end is significantly larger. Then just rearwardly of the wedge surface 44 the wedge member has a weakened circumferential wall section 46 which provides a shear point. At its rearward end the wedge member has a hexagonal opening 48 adapted to receive a conventional allen wrench. Just forwardly of the hexagonal wrench opening 48 there is a central opening 49 that makes possible the weakened wall section 46.

Bolt 20 on its forward end has a concentric end opening identified by numeral 30, which is unthreaded. At the bottom of opening 30 a slightly smaller opening has internal threads 32. Internal threads 32 have a rotational sense opposite to that of external threads 27; that is, if the external threads are right-hand, the internal threads are left-hand, or vice-versa. As seen from the drawing, threads 42 of the wedge member are mated with the internal threads 32 of the bolt.

At the forward extremity of bolt 20 the end opening 30 is further enlarged as shown at 34, providing a circumferential shoulder 35 between the opening sections 34 and 30. The wedge surface 44 of the wedge member is of such size as to pass entirely within the initially encountered end opening 34; however, it engages the interior wall surface of the bolt at the location of the shoulder 35. It is preferred to provide a slight taper 36 on the interior wall of the bolt immediately rearwardly of shoulder 35 (below the shoulder as it appears in the drawing).

A further important feature of bolt 20 is that axial slots 37 are formed in its forward end wall. While the drawing shows only two such slots separated circumferentially by 180 degrees, it is actually preferred to utilize four or more slots. The axial length of these slots is such as to be co-extensive with the end opening sections 34 and 30, but not with the smaller and inner portion of the opening which carries the internal threads 32.

Among the particular design features, external threads 27 on the bolt and threads 52 within the nut preferably have a loose or clearance fit as this facilitates the rapid attachment of the nut. However, the internal threads 32 of the bolt and the threads 42 of the wedge member may advantageously have a somewhat tight or interference fit to make it easier to hold the bolt in place while the nut is being tightened.

As another feature of design, the recess or opening 49 is preferably flat on the bottom so that the wedge member when sheared off at point 46 presents a relatively smooth upper surface.

OPERATION

In the type of application for which the present invention is intended, the operator works from only one side of the body that is being constructed. It is necessary for the operator to hold the bolt against rotation while the nut is being attached. Since the bolt does not have its own wrench socket, this may appear to be difficult, but in fact it is not. The present invention makes full and adequate provision for a simple and reliable installation procedure.

It is preferred to assemble the wedge member 40 to the bolt 20 as a factory operation. They are assembled together only loosely, or somewhat tightly, to avoid any possible expansion of the end of the bolt. This preassembly facilitates and simplifies the field operation.

In the field, the bolt 20 carrying wedge member 40 is inserted through the hole 18. Then the nut 50 is placed over the end of the bolt on threads 27. An allen wrench is then inserted into wrench socket 48 of the wedge member. The allen wrench is held in position while the nut is run and tightened.

If the mating threads 42, 32 are relatively tight threads, the friction at those threads may alone be sufficient to hold the bolt against rotation during the free rotation of the nut. If the mating threads are loose, rotation of the nut may drag the bolt through some rotation, thereby causing the set screw or wedge member to be screwed more deeply into the bolt, perhaps until wedge surface 44 contacts the taper 36 and thus holds the bolt against any further rotation.

After the nut completes its free rotation and engages the surface 16, the allen wrench is not needed but may be left in place. Assuming that the coefficient of static friction at the bolt head is comparable to that at the nut surface, it can be shown mathematically that the contact friction of head 22 on surface 14 is sufficient to prevent rotation of bolt 20 while nut 50 is being tightened. The nut is then tightened by suitable means to the desired torque level. If the wrench portion 56 is used, it is sheared off; otherwise, the tool that is employed will itself establish the desired level of torque which must be reached before the tightening of the nut is complete.

Then the set screw or wedge member 40 is tightened. The tightening of the wedge member causes the slotted end portion of the bolt 20 to expand, thus tightening the engagement of external bolt threads 27 with the nut internal threads 52. When the desired torque level for the wedge member is reached, it shears off at the weakened wall section 46. The rearward portion including wrench socket 48 is then removed.

It is important to note that the wedge member 40 is so designed that the shear-off torque for its weakened wall section 46 is no greater than the final torque applied in tightening the nut. Preferably, the shear-off torque for the wedge member is made significantly lower than the final tightening torque for the nut, so as to positively assure that the tightening of the wedge member will not disturb the fastening arrangement.

It will be seen that in the final condition of the fastener (involving one or two more steps than illustrated in the present drawing) the end result is a tamper-proof installation. The wedge member 40 shears off at a point which is somewhat inside the extremity of the end opening 34 of the bolt, preferably leaving a smooth surface when the bottom of recess 49 is made flat. The fastener is then secure in every respect.

The invention has been described in considerable detail in order to comply with the patent laws by providing a full public disclosure of at least one of its forms. However, such detailed description is not intended in any way to limit the broad features or principles of the invention, or the scope of patent to be granted, which is measured by the following claims.

What is claimed is:

1. A three-piece fastener including a bolt with a shank having a concentric opening in its threaded end, a nut adapted to fit over the threaded end of the bolt, and a wedge member which is insertable into the end opening of the bolt for expanding and thereby securing it;

the threaded end of the bolt being axially slotted to facilitate its expansion, and the outer diameter of the wedge member being smaller than the outer diameter of the threaded end of the bolt, so that when the bolt is to be inserted into an opening of a structure in order to accomplish a fastening action, the wedge member may first be loosely inserted into the end opening of the bolt, the bolt and wedge may be passed through the opening, the nut may be applied to the end of the bolt and tightened, and the wedge may thereafter be tightened in order to expand the end of the bolt;

the end opening of the bolt having interior threads which are threadedly engaged by the wedge member but in an opposite rotational sense to that in which the nut is applied to the bolt; and the wedge member having a driving portion on its outer end, and a weakened circumferential wall which fractures and shears off when a predetermined torque is applied for tightening the wedge member, the location of the weakened wall being such that after the shearing action takes place the remaining part of the wedge member is substantially contained within the end of the bolt.

2. A three-piece fastener comprising:

(a) a bolt having a shank with a head on one end thereof, the other end of said shank having a cylindrical external surface upon which external threads are formed;

said other end of said shank also having a concentric opening therein which extends axially throughout a substantial portion of the length of said external threads, the inner end portion of said concentric opening having a cylindrical interior surface upon which internal threads are formed with a rotational sense opposite to that of said external threads;

the outer end portion of said concentric opening being enlarged beyond the diameter of said internal threads;

said enlarged end portion of said concentric opening and said external threads defining therebetween a circumferential wall of said bolt shank, said circumferential wall being slotted from its extreme outer end longitudinally inwardly on at least two points on its circumference;

(b) a set screw having outer and inner ends, said inner end being threaded and adapted to mate with said internal threads of said bolt, said outer end being of larger diameter than said inner end and having a wrench socket formed therein;

the portion of said set screw located just outwardly of said threaded inner end thereof having a conical outer wall surface;

said set screw also having a weakened wall section which is located near the forward end of said wrench socket but rearwardly of said conical surface portion; and (c) a nut having an internal thread adapted to mate with said external threads of said bolt, and having an external wrench-gripping surface.

3. A fastener attachable through an opening in an assembly for securely gripping the two sides of the assembly together, comprising:

(a) a bolt having a head, a shank with an externally threaded end, a concentric opening in the threaded end of said shank which is internally threaded in a rotational sense opposite to that of the external threads, the outer end portion of the concentric opening being enlarged and its surrounding wall being axially slotted;

(b) a wedge member having a cylindrical forward end which is externally threaded to mate with the internal threads in said bolt, a wrench socket formed in its rearward end, and a tapered wedge section located intermediate to said threaded forward end and said wrench socket;

said wedge member having a weakened circumferential wall in the vicinity of the juncture between said wedge section and said wrench socket;

said wedge member having an external diameter which is less than the diameter of said threaded end of said bolt so that said threaded forward end of said wedge member may be at least partially inserted into said bolt prior to inserting said bolt into the opening of the body; and (c) a nut adapted to mate with the external threads on said bolt so that the two sides of the assembly may be securely gripped between the bolt head and said nut;

said wedge member being adapted to then be further tightened so as to first radially expand said slotted wall of said bolt within said nut, and thereafter to fracture said weakened circumferential wall so that said wrench socket may be removed but said wedge section and said threaded forward end of said wedge member will remain within said bolt.

4. A fastener as in claim 3 wherein said enlarged portion of said concentric opening in said bolt shank is sufficiently large at its outer extremity to permit the entire tapered wedge section of said wedge member to enter therein; said enlarged opening in its interior portion being of such size as to cooperate with said tapered wedge section to produce a wedging action; whereby when said wrench socket is removed, the remaining portion of said wedge member is wholly contained within said bolt.

5. A fastener as in claim 3 wherein said nut also has a weakened circumferential wall section adapted to be sheared off when a predetermined torque level is reached.

6. A fastener as in claim 5 wherein the predetermined torque level for shearing off the weakened circumferential wall of said wedge member is less than the predetermined torque level for shearing off the weakened circumferential wall of said nut.

7. A fastener as in claim 3 wherein said weakened circumferential wall section of said wedge member is so positioned that when it is sheared off, the remaining extremities of said wedge member lie entirely within said bolt.

8. The method of securely gripping together two surfaces of an assembly which has a hole therethrough, comprising the steps of:
    (a) selecting a bolt which has a concentric opening in its threaded end and in which the wall around said opening is axially slotted;
    (b) selecting an elongated wedge having an outer diameter which is less than the outer diameter of the threaded end of said bolt;
    (c) partially inserting the wedge into said concentric opening of said bolt;
    (d) then inserting the bolt, carrying the wedge, through the hole in the assembly so that the head of the bolt engages one surface of the assembly and the threaded end of the bolt protrudes from the other surface of the assembly;
    (e) then placing a nut over the wedge and upon the threaded end of the bolt, and tightening the nut against said other surface of the assembly.
    (f) then driving the wedge further into the concentric opening in the bolt so as to expand the slotted wall of the threaded end of the bolt tightly against the inner surface of the nut; and
    (g) thereafter shearing off and removing whatever portion of the wedge protrudes beyond the end of the bolt, so as to ensure the permanency of the fastening.

9. The method of claim 1 wherein the bolt is so selected as to have internal threads with a rotational sense opposite to that of the external threads of the bolt, and the wedge is selected to have external threads on its forward end which mate with the internal threads of the bolt.

10. The method of claim 9 wherein the wedge is additionally selected to have a wrench socket on its rearward end, and a weakened circumferential wall portion forwardly of said wrench socket, whereby the tightening of the wedge causes the wrench socket to break off.

* * * * *